(12) United States Patent
Pan et al.

(10) Patent No.: US 8,123,842 B2
(45) Date of Patent: Feb. 28, 2012

(54) DIRECT CONTACT COOLING IN AN ACID GAS REMOVAL PROCESS

(75) Inventors: Junfeng Pan, Beijing (CN); Richard Huang, Vernon Hills, IL (US); Lamar A. Davis, West Dundee, IL (US)

(73) Assignee: UOP LLC, Des Plaines, IL (US)

( * ) Notice: Subject to any disclaimer, the term of this patent is extended or adjusted under 35 U.S.C. 154(b) by 634 days.

(21) Appl. No.: 12/354,916

(22) Filed: Jan. 16, 2009

(65) Prior Publication Data
US 2010/0132563 A1 Jun. 3, 2010

(51) Int. Cl.
*B01D 53/14* (2006.01)
(52) U.S. Cl. ............ 96/234; 96/242; 95/159; 95/236; 95/227
(58) Field of Classification Search .............. 96/234, 96/242; 95/159, 227, 236
See application file for complete search history.

(56) References Cited

U.S. PATENT DOCUMENTS

| | | | |
|---|---|---|---|
| 2,715,948 A | | 8/1955 | Warren et al. |
| 3,199,266 A | * | 8/1965 | Quester et al. ............... 95/158 |
| 4,152,217 A | * | 5/1979 | Eisenberg et al. ............ 203/2 |
| 4,213,302 A | | 7/1980 | Woinsky |
| 4,357,801 A | | 11/1982 | Wahl, III |
| 4,614,644 A | | 9/1986 | Lampton, Jr. et al. |
| 5,145,658 A | | 9/1992 | Chao |
| 5,543,122 A | | 8/1996 | Hammond et al. |
| 5,925,291 A | | 7/1999 | Bharathan et al. |
| 6,282,497 B1 | | 8/2001 | Bharathan et al. |
| 7,208,648 B2 | | 4/2007 | Lumgair, Jr. et al. |
| 2004/0154469 A1 | | 8/2004 | Asprion et al. |
| 2006/0032377 A1 | * | 2/2006 | Reddy et al. ............... 96/234 |
| 2008/0184887 A1 | * | 8/2008 | Mak ............................ 95/174 |

FOREIGN PATENT DOCUMENTS
WO 01/72393 A1 10/2001

OTHER PUBLICATIONS

Price, B.C. et al., "SPE 14057/Sour Gas Processing for Gas Sales and LNG Production," SPE (Soc. Pet. Eng.)—Chinese Pet. Soc. Pet. Eng. Soc., Int. Pet. Eng. Meet. Proc., Beijing, China 1986, vol. 1, pp. 145-155 (abstract only).

(Continued)

*Primary Examiner* — Duane Smith
*Assistant Examiner* — Pankti Patel
(74) *Attorney, Agent, or Firm* — Mark Goldberg

(57) ABSTRACT

Systems and processes disclosed herein relate to the utilization of direct contact condensing to provide heat to a solvent regeneration loop in an acid gas removal process. A first direct contact condenser can be included in the upper section of a concentrator that removes acid gas from a rich solvent stream. A first slip stream can be heated in the first direct contact condenser and can be combined with the rich solvent stream in the lower section of the stripper. A second direct contact condenser can be included in the lower section of an absorber that removes acid gas from a feed gas. A second slip stream can be heated in the second direct contact condenser, and can be combined with the rich solvent stream before the rich solvent stream is provided to the concentrator.

20 Claims, 2 Drawing Sheets

OTHER PUBLICATIONS

Svedberg, G., "Advanced Heat Recovery from Flue Gases," Fernwaerme International, May-Jun. 1986, vol. 15, No. 3. pp. 128-132 (abstract only).

Powley, "In a Design for Direct Contact Heat Transfer," Chem. Inst. Can. Conf., Quebec. 1965, Brit. Chem. Eng., Feb. 1966, vol. 11, No. 2.86 (abstract only).

Zangrando, F. et al., "Direct-Contact Condensation of Low-Density Steam on Seawater at High Inlet Noncondensable Concentrations," Journal of Heat Transfer, Transactions ASME, Aug. 1993, vol. 115, No. 3, pp. 690-705 (abstract only).

* cited by examiner

DIRECT CONTACT COOLING IN AN ACID GAS REMOVAL PROCESS

FIELD OF THE INVENTION

Systems and processes disclosed herein relate generally to acid gas removal, and more particularly to the utilization of heat exchange to provide heat that can be used to increase the temperature of the hot solvent regeneration loop in an acid gas removal process.

DESCRIPTION OF RELATED ART

Acid gas removal processes are used widely in gas processing industries to separate acid gases from feed gases of natural gas or synthetic gas. Synthetic gas streams can be, for example, synthesis gas produced by gasification of coal, coke, or heavy hydrocarbon oils. By separating acid gases, the feed gas is made more suitable for combustion and/or further processing. Some acid gas removal processes can utilize a physical solvent, such as, for example, a dimethyl ether of polyethylene glycol, which is commercially available under the trade name Selexol®, available from The Dow Chemical Company. The Selexol® process, licensed by UOP, is one known process that utilizes the Selexol® physical solvent. Such processes can be ideally suited for the selective removal of hydrogen sulfide ($H_2S$) and other sulfur compounds, or for the bulk removal of carbon dioxide (CO2). Such processes can also be used for removal of carbonyl sulfide (COS), mercaptans, ammonia, hydrogen cyanide (HCN) and metal carbonyls.

SUMMARY OF THE INVENTION

Systems and processes disclosed herein relate to the utilization of direct contact condensing to provide heat that can be used to increase the temperature of the hot solvent regeneration loop in an acid gas removal process.

In one aspect, an acid gas removal process is provided that includes a first absorber, a bridge heat exchanger, and a concentrator. The first absorber produces a rich solvent stream that is withdrawn from the first absorber as an effluent stream. The bridge heat exchanger heats at least a portion of the rich solvent stream to produce a heated rich solvent stream. The concentrator produces a stripped gas stream as an overhead stream and a partially stripped solvent stream as a bottoms stream. The concentrator includes an upper section that includes a first direct contact condenser and an inlet above the first direct contact condenser that receives a first slip stream, the first slip stream being separated from the rich solvent stream, and a lower section that includes a stripping section, an inlet that receives a stripping gas, and an inlet that receives the heated rich solvent stream.

In a second aspect, an acid gas removal process is provided that includes a first absorber, a bridge heat exchanger, a concentrator, a separator, and one or more compressors. The first absorber produces a rich solvent stream that is withdrawn from the first absorber as an effluent stream. The first absorber includes an upper section that includes absorbent medium that removes acid gas from a feed gas and an inlet that receives the feed gas, and a lower section that includes a second direct contact condenser and an inlet below the second direct contact condenser that receives a compressed recycle gas stream. The bridge heat exchanger heats at least a portion of the rich solvent stream to produce a heated rich solvent stream. The concentrator produces a stripped gas stream as an overhead stream and a partially stripped solvent stream as a bottoms stream. The concentrator includes an upper section that includes a first direct contact condenser and an inlet above the first direct contact condenser that receives a first slip stream, the first slip stream being separated from the rich solvent stream, and a lower section that includes a stripping section, an inlet that receives a stripping gas, and an inlet that receives the heated rich solvent stream. The separator receives the stripped gas stream and produces a recycle gas stream as an overhead stream. The one or more compressors receive the recycle gas stream and produce the compressed recycle gas stream.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
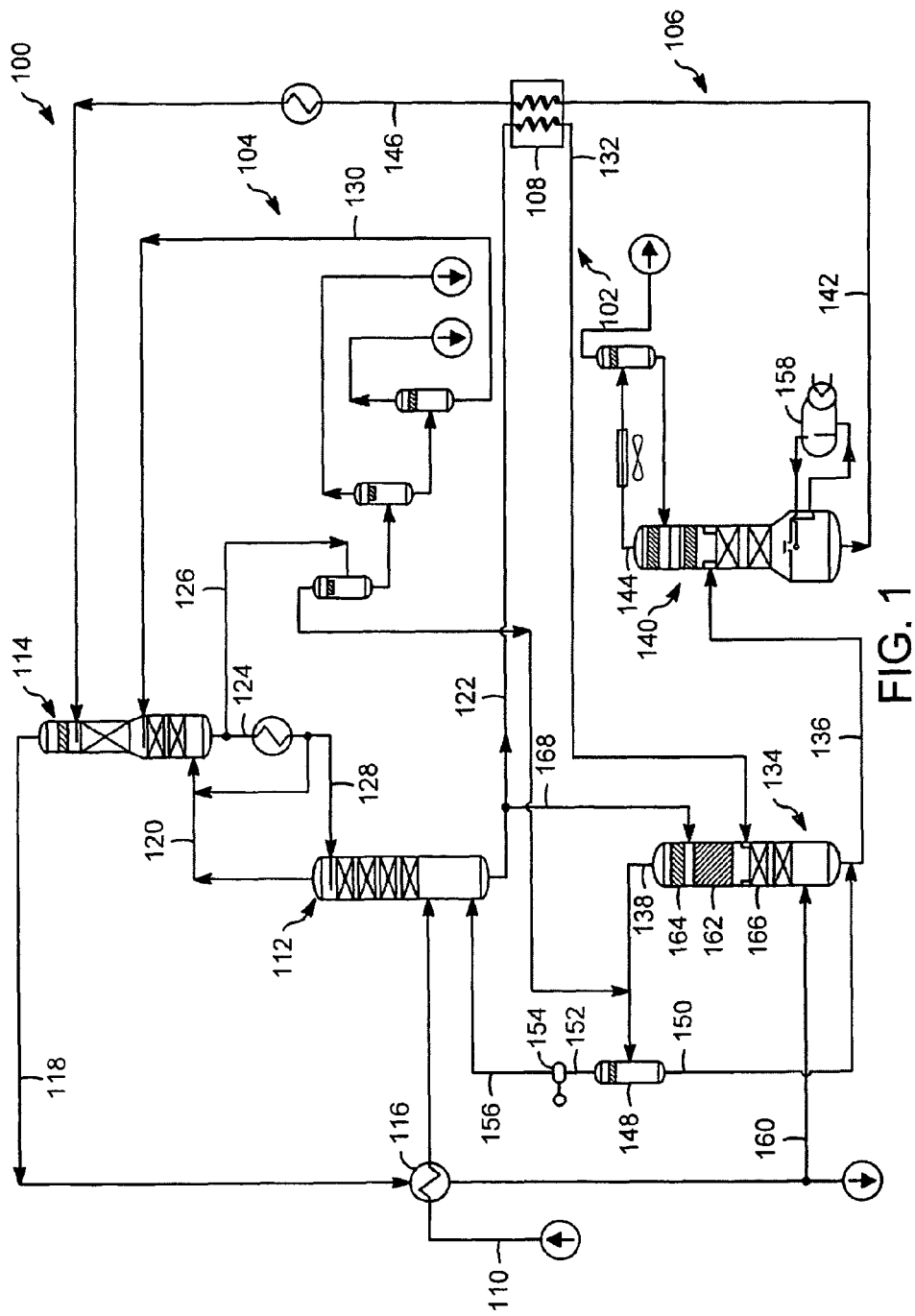
FIG. 1 illustrates a simplified system flow diagram for a Selexol® acid gas removal process utilizing a first direct contact condenser.
Figure 2:
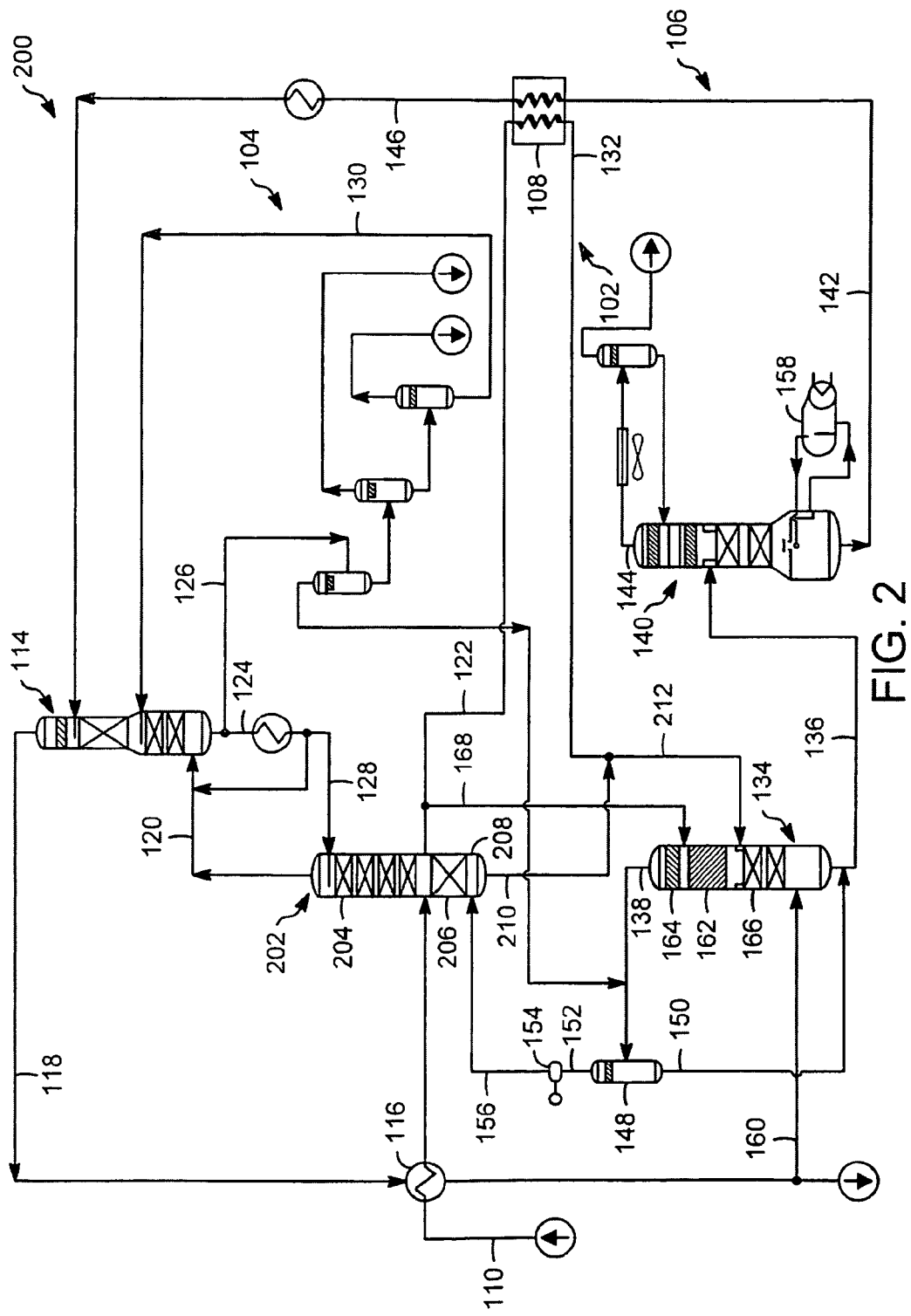
FIG. 2 illustrates a simplified system flow diagram for a Selexol® acid gas removal process utilizing a first direct contact condenser and a second direct contact condenser.

Simplified system flow diagrams of an acid gas removal processes 100 and 200 are illustrated in FIGS. 1 and 2. Acid gas removal processes 100 and 200 are Selexol® processes, although it should be understood that the direct contact condensers and heat exchange processes described herein can be applied to other acid gas removal processes. It should also be understood that the streams illustrated in FIGS. 1 and 2 can be passed through conduits from one unit to another, with the utilization of valves and pumps as appropriate.

As illustrated in FIGS. 1 and 2, a feed gas 110 is provided to at least one gas absorber 112 wherein an acid gas is removed from the feed gas 110. The processes 100 and 200 as shown includes a first gas absorber 112 and a second gas absorber 114, which operate in a two-stage counter-current flow process for acid gas removal. As illustrated, the first stage utilizes first gas absorber 112 to remove hydrogen sulfide from the feed gas 110, and can remove at least some carbon dioxide as well. The second stage utilizes second gas absorber 114 to remove carbon dioxide. First and second absorbers 112 and 114 each contain an absorbent material, or solvent, such as, for example, Selexol®, which absorbs acid gas and thus removes acid gas from the feed gas 110. As the capacity of the solvent to absorb gas is reached, the solvent becomes spent and needs to be regenerated before it can be used again for absorption. Regeneration of the solvent removes acid gas from the solvent.

The solvent utilized in the processes 100 and 200 can be regenerated thermally, by flashing, or with a stripping gas. The processes 100 and 200 as illustrated in FIGS. 1 and 2 include all three types of solvent regeneration at various points in the process.

Generally, the processes 100 and 200 include a cold acid gas absorption loop 102, a cold solvent flash regeneration loop 104, and a hot solvent stripping regeneration loop 106. In practice, it is desirable and beneficial to maintain the hot solvent stripping loop 106 as hot as process limits allow, while at the same time maintaining the cold loops 102 and 104 as cold as process limits allow. The systems and processes disclosed herein utilize direct contact condensers to provide heat to increase the temperature of the hot solvent stripping regeneration loop 106 in acid gas removal processes 100 and 200.

In some acid gas removal processes, such as the Selexol® processes illustrated in FIGS. 1 and 2, a bridge heat exchanger 108 is typically used to bridge the hot and cold loops via heat exchanging between cold rich solvent and hot lean solvent. The bridge heat exchanger 108 can be a low temperature approach heat exchanger, such as a Packinox heat exchanger, available from Alfa Laval. The temperature approach can be as low as the range of 5° C. to 10° C. at the cold end of the exchanger. However, the temperature approach at the hot end can be as high as 35° C. to 40° C. in a typical design. This high hot end temperature approach is due to excess mass (acid gas loading) in the cold rich solvent as compared to the hot lean solvent. A high temperature approach in the bridge heat exchanger 108 indicates energy inefficiency, which can result in a low feed temperature to the hot solvent regeneration loop 106. Another energy inefficiency can occur as a result of loss of process heat in the concentrator and stripper overhead air-cooled condensers, which accounts for 20-30% of the stripper reboiler duty. Stripper reboiler duty in a large Selexol® unit can easily be as high as 200 MMBTU/hr. As discussed below, the acid gas removal processes 100 and 200 illustrated in FIGS. 1 and 2 utilize direct contact condensing to provide heat that can preferably reduce the energy inefficiencies and reduce the reboiler duty.

Referring to FIG. 1, feed gas 110 can pass through a feed-product heat exchanger 116 prior to entering the first gas absorber 112. Feed-product heat exchanger 116 can be used to heat feed gas 110 and cool product gas 118.

The first gas absorber 112 contains an absorbent medium, such as Selexol®, which absorbs acid gas, such as, for example, hydrogen sulfide. The feed gas 110 thus undergoes a first absorption process in the first absorber 112, which removes acid gas from the feed gas 110. First gas absorber 112 produces an intermediate product stream 120 as an overhead stream and a first rich solvent stream 122 as an effluent stream, which can be a bottoms stream. First rich solvent stream 122 contains spent solvent and acid gas, the spent solvent having absorbed the acid gas during the first absorption process. The various solvent containing streams in acid gas removal process 100 can include various levels of acid gas, such as, for example, having a substantial amount of acid gas and thus being rich, having at least some acid gas removed and thus being semi-lean, and having substantially all of the acid gas removed and being lean. The use of the term "rich" in describing first rich solvent stream 122 thus designates that the solvent stream is rich with acid gas.

Intermediate product stream 120 can be passed to second gas absorber 114. Second gas absorber 114 contains an absorbent medium, such as Selexol®, that absorbs acid gas, such as, for example, carbon dioxide. The intermediate product stream 120 undergoes a second absorption process in the second absorber 114, which removes acid gas from the intermediate product stream 120. Second gas absorber 114 produces a product stream 118 as an overhead stream, and a second rich solvent stream 124 as a bottoms stream. Product stream 18 contains treated gas, and can be passed to heat exchanger 116 to heat feed gas stream 110 before being passed downstream for further processing or for use in a desired application. Second rich solvent stream 124 contains spent solvent and acid gas, the spent solvent having absorbed the acid gas during the second absorption process.

Second rich solvent stream 124 can be divided into at least two streams, including a cold solvent flash regeneration stream 126 and a return stream 128. In at least one example, a portion of the second rich solvent stream 124 can be separated to form return stream 128, and the remainder of the second rich solvent stream 124 can be separated to form cold solvent flash regeneration stream 126. The cold solvent flash regeneration stream 126 can undergo flash regeneration in cold solvent flash regeneration loop 104 to remove at least some of the absorbed acid gas from the solvent and produce semi-lean solvent stream 130, which can then be returned to the second gas absorber 114. The return stream 128 can be passed to the first gas absorber 112. The spent solvent and acid gas in return stream 128 can exit the first gas absorber 112 as part of first rich solvent stream 122.

Rich solvent stream 122 is part of cold acid gas absorption loop 102. At least a portion of rich solvent stream 122 can be passed to bridge heat exchanger 108, to produce heated rich solvent stream 132. Heated rich solvent stream 132 can be the feed stream for the hot solvent stripping regeneration loop 106. Heated rich solvent stream 132 can undergo a two stage stripping process to remove acid gas.

In the first stripping stage, a first stripper, such as, for example, concentrator 134, can be utilized. Concentrator 134 can be a stripper that utilizes a stripping gas 160 to remove acid gas, such as, for example, carbon dioxide. The stripping gas can also remove at least some of other acid gasses that may be present, such as, for example, hydrogen sulfide. The stripping gas 160 can, for example, include hydrogen, and can preferably be primarily hydrogen.

Concentrator 134 can have a first direct contact condenser 162 in the upper section 164 of the concentrator 134, and can have a lower section 166 that is a stripping section. A first slip stream 168 can be separated from the rich solvent stream 122 and can be provided to an inlet in the upper section 164 of the concentrator 134, at or above the first direct contact condenser 162. First slip stream 168 can preferably be from about 5% by weight to about 20% by weight of the rich solvent stream 122. The heated rich solvent stream 132 can be a feed stream that is received by the concentrator 134, and can be provided to an inlet in the lower section 166 of the concentrator 134, preferably at the top of the lower section 166, below first direct contact condenser 162.

The stripping gas 160 can be provided at the bottom of the lower section 166 of the concentrator 134. The stripping gas can rise through the lower section 166 of the concentrator 134 as the heated rich solvent stream 132 proceeds downwardly through the lower section 166 of the concentrator 134. The lower section of the concentrator 134 can include trays, or other suitable structure, to facilitate contact between the stripping gas 160 and the as the heated rich solvent stream 132 and thus promote acid gas stripping. The stripping gas 160 can remove, or strip, acid gas, such as, for example, carbon dioxide, from the heated rich solvent stream 132. The stripping of the acid gas in the lower section 166 of the concentrator 134 can tend to generate heat, which can tend to rise through the lower section 166 of the concentrator 134 in combination with the stripping gas 160 and the acid gas that is stripped from the solvent by the stripping gas 160. The combination of heat, stripped acid gas and stripping gas can rise to the upper section 164 of the concentrator 134, and can enter the first direct contact condenser 162.

The first direct contact condenser 162 can be a heat exchanger, such as, for example, a packed bed, that that provides heat transfer and mass transfer between the first slip stream 168 and the combination of heat, stripped acid gas and stripping gas generated in the lower section 166 of the concentrator 134. In one example, first direct contact condenser 162 is a packed bed heat exchanger that contains structural packing material, which can be random packing such as, for example, Raschig rings. The first slip stream 168 can be received by the direct contact condenser 162, and can pass downwardly through the direct contact condenser 162. As it passes downwardly through the direct contact condenser 162, the first slip stream 168 can be heated by the combination of heat, stripped acid gas and stripping gas generated in the lower section 166 of the concentrator 134. After passing through the direct contact condenser, the heated first slip stream 168 can enter the lower section 166 of the concentrator 134 to combine with the heated rich solvent stream 132 and undergo acid gas stripping. The combination of heat, stripped acid gas and stripping gas generated in the lower section 166 of the concentrator 134 can pass upwardly though the direct contact condenser, provide heat to the first slip stream 168, and exit the concentrator 134 in an overhead stream as stripped gas stream 138. Stripped gas stream 138 can include carbon dioxide and the stripping gas, and can also include hydrogen sulfide and other components from the feed gas 110.

Concentrator 134 produces a partially stripped solvent stream 136 as a bottoms stream. The use of first slip stream 168 can increase the temperature of heated rich solvent stream 132 as it enters the concentrator 134. Preferably, use of the first slip stream 168 can increase the temperature of heated rich solvent stream 132 by about 10° C. to about 15°, or greater. The temperature increase can enhance the performance of concentrator 134. The temperature increase can also result in an increased the temperature of partially stripped solvent stream 136, and can reduce the required duty of reboiler 158.

Partially stripped solvent stream 136 can be passed to a second stripper, such as, for example, regenerator 140 to remove remaining acid gas from the solvent. Regenerator 140 can, for example, utilize thermal stripping to remove hydrogen sulfide from the partially stripped solvent stream 136. Reboiler 158 can be used in conjunction with regenerator 140 in order to facilitate the process of removing acid gas from the solvent in regenerator 140. Regenerator 140 produces an acid gas stream 144 as an overhead stream, and a lean solvent stream 142 as a bottoms stream.

Lean solvent stream 142 can be passed to bridge heat exchanger 108 to provide heat to rich solvent stream 122 and thus produce cooled lean solvent stream 146. Cooled lean solvent stream 146 can be passed to second absorber 114 to replenish the solvent in second absorber 114 and to once again undergo the absorption process.

Stripped gas stream 138, the overhead stream from concentrator 134, can be passed to a separator 148, such as a knock-out drum, which can remove liquid from the stripped gas stream to produce concentrator overhead condensate stream 150 as a bottoms stream and recycle gas stream 152 as an overhead stream. Recycle gas stream 152 can be passed to one or more compressors 154 to produce compressed recycle gas stream 156. Compressed recycle gas stream 156 can be passed to the first absorber 112. Concentrator overhead condensate stream 150 can be combined with partially stripped solvent stream 136 and can be provided to regenerator 140.

Referring to FIG. 2, an acid gas removal process 200 is shown that is similar to acid gas removal process 100, with like reference numerals being utilized to reference like components and aspects. Acid gas removal process 200 has a first absorber that is a direct contact condensing absorber. Direct condensing absorber 202 includes a second direct contact condenser 206. Acid gas removal process 200 also includes second slip stream 210 that can be combined with the heated rich solvent stream 132 to form a combined rich solvent stream 212.

As illustrated in FIG. 2, the direct contact condensing absorber 202 has an upper section 204 and a lower section 208 that includes the second direct contact condenser 206. The feed gas 110 can be passed to an inlet of the direct contact condensing absorber 202 in the upper section 204, above the second direct contact condenser 206. The upper section 204 of the direct contact condensing absorber 202 contains an absorbent medium, such as Selexol®, which absorbs acid gas, such as, for example, hydrogen sulfide. The feed gas 110 thus undergoes a first absorption process in the upper section 204 of the direct contact condensing absorber 202, which removes acid gas from the feed gas 110. The direct contact condensing absorber 202 produces an intermediate product stream 120 as an overhead stream and a first rich solvent stream 122 as an effluent stream. As illustrated in FIG. 2, first rich solvent stream 122 can be withdrawn from the direct contact condensing absorber 202 at the bottom of the upper section 204, above the second direct contact condenser 206. First rich solvent stream 122 can contain spent solvent and acid gas, the spent solvent having absorbed the acid gas during the first absorption process.

A second slip stream 210 can be separated from the first rich solvent stream 122 within the direct contact condensing absorber 202, and can be passed to the second direct contact condenser 206 in the lower section 208 of the direct contact condensing absorber 202. Second slip stream 210 can preferably be from about 5% by weight to about 20% by weight of the rich solvent stream 122. Second slip stream 210 can pass downwardly through the second direct contact condenser 206.

The compressed recycle gas stream 156 as discussed above with reference to FIG. 1, can be provided to an inlet at the bottom of the lower section 208 of the direct contact condensing absorber 202, below the second direct contact condenser 206, and can pass upwardly through the second direct contact condenser 206.

The second direct contact condenser 206 can be a heat exchanger, such as, for example, a packed bed, that that provides heat transfer and mass transfer between the second slip stream 210 and the compressed recycle gas stream 156. In one example, second direct contact condenser 206 is a packed bed heat exchanger that contains structural packing material, which can be random packing such as, for example, Raschig rings.

As is passes downwardly through the second direct contact condenser 206, the second slip stream 206 can be heated by the compressed recycle gas stream 156. Second slip stream 210 can be removed from the direct contact condensing absorber 202 and combined with the heated rich solvent stream 132 to form a combined rich solvent stream 212. Combined rich solvent stream 212 can be a feed stream that is received by the concentrator 134, and can undergo a two stage stripping process such as is described above with respect to heated rich solvent stream 132 in FIG. 1.

In at least some examples, utilization of the second direct contact condenser and the second slip stream as illustrated in FIG. 2 can result in a combined rich solvent stream 212 that has increased temperature as compared to heated rich solvent stream 132. The increased temperature can enhance the performance of concentrator 134. The increased temperature of the combined rich solvent stream 212 can also result in an increased the temperature of partially stripped solvent stream 136, and can reduce the required duty of reboiler 158.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An acid gas removal system comprising:
   a first absorber that produces a rich solvent stream that is withdrawn from the first absorber as an effluent stream;
   a bridge heat exchanger that heats at least a portion of the rich solvent stream to produce a heated rich solvent stream; and
   a concentrator that produces a stripped gas stream as an overhead stream and a partially stripped solvent stream as a bottoms stream, the concentrator including:
   an upper section that includes a first direct contact condenser and an inlet above the first direct contact condenser that receives a first slip stream, the first slip stream being separated from the rich solvent stream; and
   a lower section that includes a stripping section, an inlet that receives a stripping gas, and an inlet that receives the heated rich solvent stream.

2. The acid gas removal system of claim 1, wherein the first slip stream includes from about 5% by weight to about 20% by weight of the rich solvent stream.

3. The acid gas removal system of claim 1, wherein the first direct contact condenser is a heat exchanger.

4. The acid gas removal system of claim 3, wherein the first direct contact condenser includes a packed bed.

5. The acid gas removal system of claim 4, wherein the packed bed of the first direct contact condenser includes a random packing material.

6. The acid gas removal system of claim 1, further comprising:
   a separator that receives the stripped gas stream and produces a recycle gas stream as an overhead stream; and
   one or more compressors that receive the recycle gas stream and produce a compressed recycle gas stream.

7. The acid gas removal system of claim 6, wherein the first absorber comprises:
   an upper section that includes absorbent medium that removes acid gas from a feed gas and an inlet that receives the feed gas; and
   a lower section that includes a second direct contact condenser and an inlet below the second direct contact condenser that receives the compressed recycle gas stream.

8. The acid gas removal system of claim 7, wherein the second direct contact condenser receives a second slip stream, the second slip stream being separated from the rich solvent stream prior to the rich solvent stream being withdrawn from the first absorber.

9. The acid gas removal system of claim 8, wherein the second slip stream includes from about 5% by weight to about 20% by weight of the rich solvent stream.

10. The acid gas removal system of claim 8, wherein the second slip stream is heated by the compressed recycle gas stream in the second direct contact condenser and is then combined with the heated rich solvent stream to form a combined rich solvent stream.

11. The acid gas removal system of claim 7, wherein the second direct contact condenser is a heat exchanger.

12. The acid gas removal system of claim 10, wherein the second direct contact condenser includes a packed bed.

13. The acid gas removal system of claim 11, wherein the packed bed of the second direct contact condenser includes a random packing material.

14. An acid gas removal system comprising:
   a first absorber that produces a rich solvent stream that is withdrawn from the first absorber as an effluent stream, the first absorber including:
   an upper section that includes absorbent medium that removes acid gas from a feed gas and an inlet that receives the feed gas; and
   a lower section that includes a second direct contact condenser and an inlet below the second direct contact condenser that receives a compressed recycle gas stream;
   a bridge heat exchanger that heats at least a portion of the rich solvent stream to produce a heated rich solvent stream;
   a concentrator that produces a stripped gas stream as an overhead stream and a partially stripped solvent stream as a bottoms stream, the concentrator including:
   an upper section that includes a first direct contact condenser and an inlet above the first direct contact condenser that receives a first slip stream, the first slip stream being separated from the rich solvent stream;
   a lower section that includes a stripping section, an inlet that receives a stripping gas, and an inlet that receives the heated rich solvent stream;
   a separator that receives the stripped gas stream and produces a recycle gas stream as an overhead stream; and
   one or more compressors that receive the recycle gas stream and produce the compressed recycle gas stream.

15. The acid gas removal system of claim 14, wherein the second direct contact condenser receives a second slip stream, the second slip stream being separated from the rich solvent stream prior to the rich solvent stream being withdrawn from the first absorber.

16. The acid gas removal system of claim 15, wherein the second slip stream is heated by the compressed recycle gas stream in the second direct contact condenser and is then combined with the heated rich solvent stream to form a combined rich solvent stream.

17. The acid gas removal system of claim 13, wherein the first direct contact condenser is a heat exchanger.

18. The acid gas removal system of claim 17, wherein the first direct contact condenser includes a packed bed.

19. The acid gas removal system of claim 18, wherein the second direct contact condenser is a heat exchanger.

20. The acid gas removal system of claim 19, wherein the second direct contact condenser includes a packed bed.

* * * * *